United States Patent
Takubo (10) Patent No.: US 9,520,807 B2
(45) Date of Patent: Dec. 13, 2016

(54) POWER CONVERTER THAT DELAYS STATE CHANGES OF ON/OFF PULSES AND CONTROL METHOD THEREOF

(71) Applicant: FUJI ELECTRIC CO., LTD., Kawasaki-shi (JP)

(72) Inventor: Hiromu Takubo, Kawasaki (JP)

(73) Assignee: FUJI ELECTRIC CO., LTD., Kawasaki-shi (JP)

(*) Notice: Subject to any disclaimer, the term of this patent is extended or adjusted under 35 U.S.C. 154(b) by 324 days.

(21) Appl. No.: 13/765,052

(22) Filed: Feb. 12, 2013

(65) Prior Publication Data
US 2013/0155740 A1 Jun. 20, 2013

Related U.S. Application Data

(63) Continuation of application No. PCT/JP2011/004707, filed on Aug. 24, 2011.

(30) Foreign Application Priority Data

Sep. 24, 2010 (JP) ................................ 2010-213223

(51) Int. Cl.
*H02M 7/5387* (2007.01)
*H02M 1/12* (2006.01)

(52) U.S. Cl.
CPC ..... *H02M 7/53871* (2013.01); *H02M 7/53875* (2013.01); *H02M 1/12* (2013.01)

(58) Field of Classification Search
CPC ............ H02M 7/53871; H02M 7/5387; H02M 7/53875; H02M 1/12; H02M 7/53878
See application file for complete search history.

(56) References Cited

U.S. PATENT DOCUMENTS

| 4,882,120 A * | 11/1989 | Roe ................... H02M 7/53875 363/37 |
| 2001/0015904 A1* | 8/2001 | Kimura ................. H02M 7/538 363/131 |
| 2002/0089321 A1 | 7/2002 | Matsuda |
| 2006/0245223 A1* | 11/2006 | Sugawara et al. ............ 363/132 |

(Continued)

FOREIGN PATENT DOCUMENTS

| CN | 101291115 A | 10/2008 |
| CN | 101762737 A | 6/2010 |

(Continued)

OTHER PUBLICATIONS

First Office Action issued in Chinese Patent Application No. 2011800390505, English translation provided.

*Primary Examiner* — Gustavo Rosario Benitez
(74) *Attorney, Agent, or Firm* — Rossi, Kimms & McDowell LLP (57) ABSTRACT

Aspects of the invention can provide a control method of a power converter that is capable of preventing increase of electromagnetic noise that are caused by simultaneous change of the states of power semiconductor switching elements of the power converter. State changes of ON/OFF pulses that are input to power semiconductor switching elements are detected, and, when the timings of the state changes of any two of the ON/OFF pulses match each other, the state change of either one of the ON/OFF pulses, of which state changes match each other, is delayed.

10 Claims, 10 Drawing Sheets

(56) References Cited

U.S. PATENT DOCUMENTS

2009/0134826 A1\* 5/2009 Hamasaki ................ H02P 6/14
 318/400.32
2009/0146590 A1\* 6/2009 Hamasaki ............... H02P 27/08
 318/400.02

FOREIGN PATENT DOCUMENTS

| JP | 01-234075 A | 9/1989 |
| JP | 03-270690 A | 12/1991 |
| JP | 2002-204581 A | 7/2002 |
| JP | 2008-113494 A | 5/2008 |
| JP | 2008-236889 A | 10/2008 |

\* cited by examiner

POWER CONVERTER THAT DELAYS STATE CHANGES OF ON/OFF PULSES AND CONTROL METHOD THEREOF

CROSS-REFERENCE TO RELATED APPLICATIONS

This application is a continuation of International Application No. PCT/JP2011/004707, filed on Aug. 24, 2011, which is based on and claims priority to Japanese Patent Application No. JP PA 2010-213223, filed on Sep. 24, 2010. The disclosure of the Japanese priority application and the PCT application in their entirety, including the drawings, claims, and the specification thereof, are incorporated herein by reference.

BACKGROUND

1. Field of the Invention

Embodiments of the invention relate to power converters and control methods thereof, and, in particular, to suppressing electromagnetic noise that is generated in a switching operation of power semiconductor elements constituting power converters.

2. Related Art

A power converter, such as an inverter for driving a motor, outputs power for controlling the motor, which is a load, by switching a power semiconductor element.

A self arc-extinguishing type power semiconductor element, such as an IGBT (Insulated Gate Bipolar Transistor) or a MOS-FET (Metal Oxide Silicon Field Effect Transistor), is known as the power semiconductor element described above. The IGBT is used hereinafter to describe the power semiconductor element.

A power semiconductor module that has a power semiconductor element such as IGBT stored in one package is used as the power converter.

A so-called intelligent power module (referred to as "IPM" hereinafter) has been put to practical use. The IPM is obtained by storing a plurality of IGBTs, a drive circuit for driving these IGBTs, a protective circuit for protecting the IGBTs from overcurrents and other abnormal states, and an insulated power supply for the drive circuit, in one package.

Figure 8:
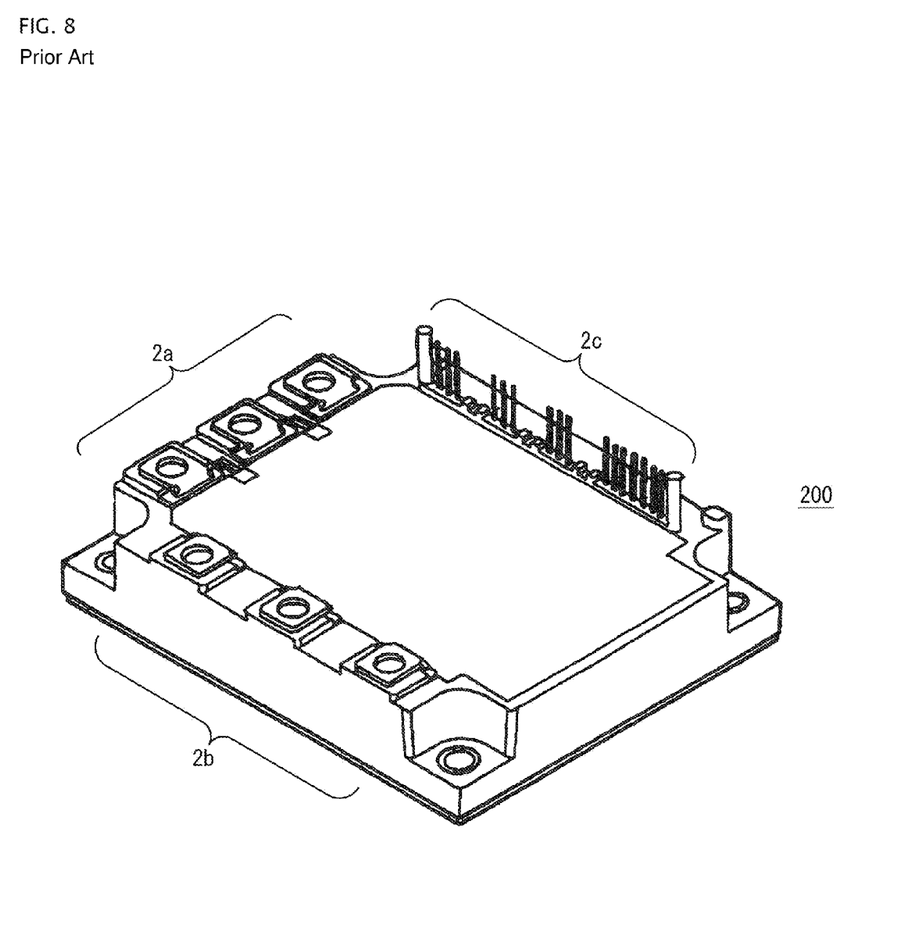
FIG. 8 is a diagram showing an exterior of an IPM.

FIG. 8 is a diagram showing the exterior of the IPM. A resin container 200 has main terminals 2a, 2b to be connected to a high-voltage large current main circuit portion. The inside of the container 200 is provided with a control terminal 2c for outputting, to a drive circuit of an IGBT (not shown), an ON/OFF signal for externally driving the IGBT, or for connecting a drive power supply to the drive circuit.

Figure 10:
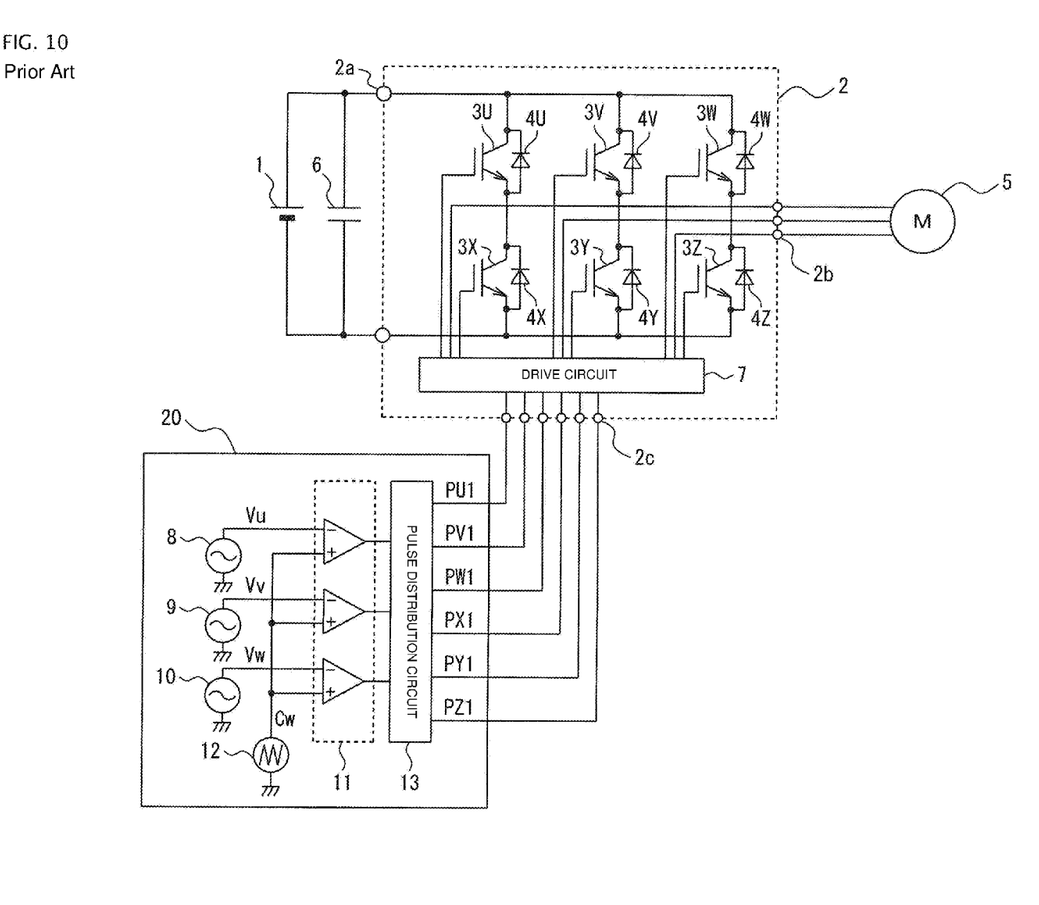
FIG. 10 is a diagram showing a circuit configuration of an inverter for driving a motor.

FIG. 10 is a diagram showing a circuit configuration of an inverter for driving a motor. In FIG. 10, reference numeral 1 represents a DC power supply obtained by rectifying a commercial power supply, 2 an IPM, and 5 a motor functioning as a load.

The IPM 2 is connected between positive and negative electrodes of the DC power supply 1. Two IGBTs 3U, 3X, which are power semiconductor elements, are connected in series between the positive and negative electrodes (between terminals 2a) in the IPM 2. Additionally, reflux diodes (FWD) 4U, 4X are connected in inverse-parallel to the IGBTs 3U, 3X. This series circuit is connected in parallel between power supplies in accordance with the number of phases of the load (for example, three circuits, in case of driving a three-phase motor).

In FIG. 10, since the load 5 has three phases, IGBTs 3V, 3Y, 3W, 3Z and FWDs 4V, 4Y, 4W, 4Z are connected in parallel with the IGBTs 3U, 3X and the FWDs 4U, 4X. By alternately switching these IGBTs that are connected vertically in series, DC power of the DC power supply 1 is converted into AC power of an arbitrary frequency and voltage, which is then output from the terminals 2b.

The motor 5 is supplied with the AC power that is output from the terminals 2b, and is driven as a load at a variable speed. In FIG. 10, reference numeral 6 represents a snubber capacitor and 7 a drive circuit. Reference numerals 2a, 2b and 2c correspond to the terminals of the container 200 of the IPM 2 shown in FIG. 8.

The patterns of ON/OFF signals that are supplied to the respective gates of the IGBTs (3U to 3W, 3X to 3Z) are obtained generally by PWM control. The ON/OFF signals for driving the respective IGBTs are generated by an external control circuit of the IPM 2.

In FIG. 10, reference numeral 20 represents a control circuit provided outside the IPM 2. Reference numerals 8 to 10 represent voltage command circuits for outputting output voltage command values Vu, Vv and Vw of respective phases, which are output by the IPM 2 (an inverter circuit for driving a motor). The output voltage command values Vu, Vv and Vw of these voltage command circuits 8 to 10 are compared with a carrier wave CW output from a carrier wave generating circuit 12 by a comparator 11, to determine PWM patterns. The PWM patterns are generated as ON/OFF signals (pulses PU1, PV1, PW1, PX1, PY1, PZ1) to the respective IGBTs (3U to 3W, 3X to 3Z) by a pulse distribution circuit 13. The generated ON/OFF signals are sent to the terminals 2c of the IPM 2.

Figure 9:
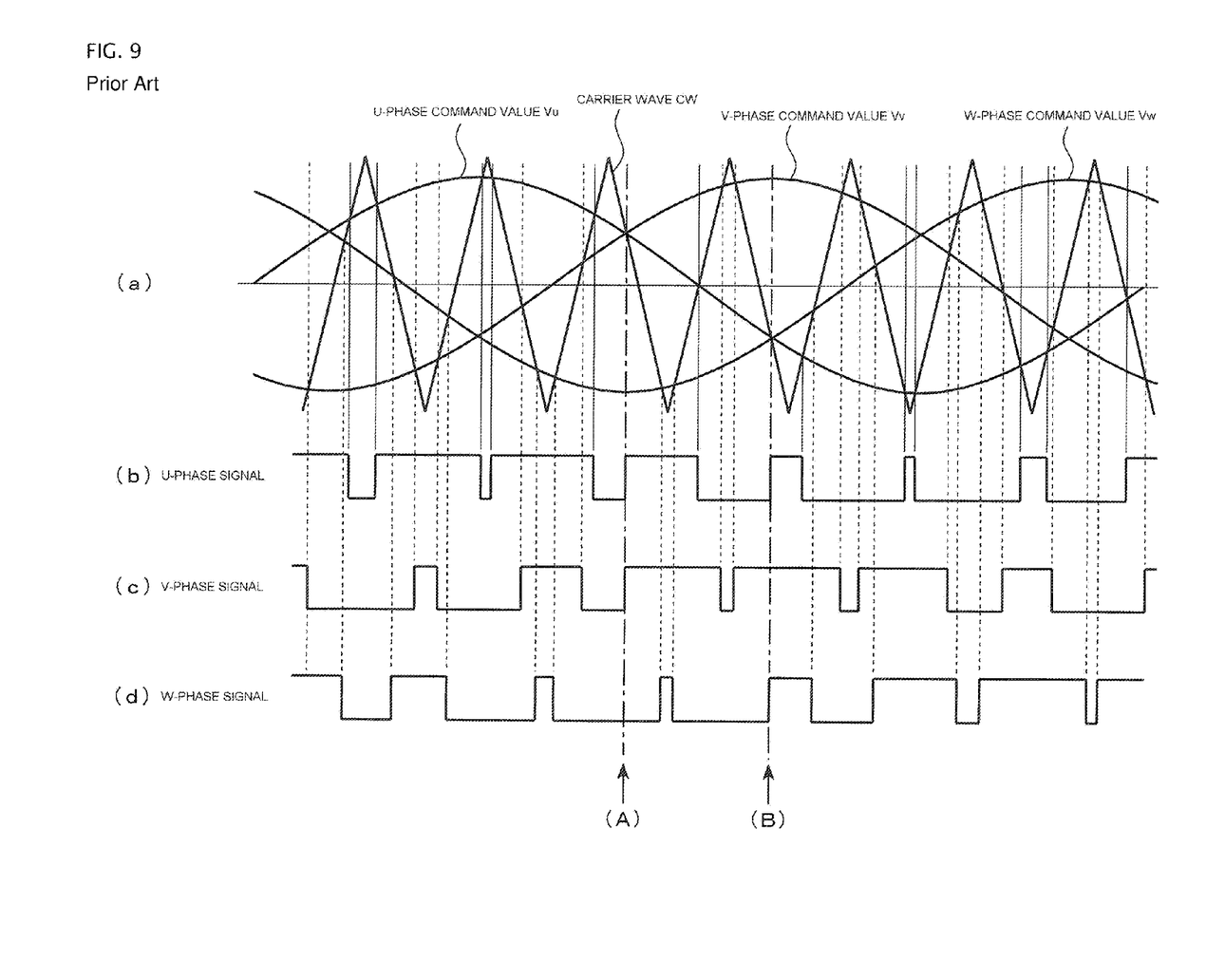
FIG. 9 is a timing diagram of a method for generating PWM patterns.

FIG. 9 is a timing diagram of a method for generating the PWM patterns described above. A three-phase inverter compares the levels of the three output voltage command values Vu, Vv and Vw, which are output from the voltage command circuits 8, 9 and 10 and the phases of which are different from each other by 120°, with the level of the carrier wave CW output from the carrier wave generating circuit 12 (see FIG. 9(a)). In a case where the levels of sine waves corresponding to the output voltage command values are greater than the level of the carrier wave CW, ON signals are applied to the IGBTs in an upper arm of the phases, and OFF signals are applied to the IGBTs in a lower arm.

For example, the U-phase output voltage command value Vu is compared with the carrier wave CW. When the U-phase output voltage command value Vu is greater than the carrier wave CW, an ON signal is applied to the IGBT 3U configuring the upper arm, and an OFF signal is applied to the IGBT 3X configuring the lower arm of the same phase.

Similarly, the same comparison is carried out for the V-phase and W-phase output voltage command values, and ON/OFF patterns for the IGBTs 3V, 3Y, 3W, 3Z of the respective phases are determined.

Such ON/OFF signals are input to the terminals 2c of the IPM 2 and amplified in such a manner that the IGBTs can be driven by the drive circuit 7, thereby driving the IGBTs. By alternately turning the serially connected IGBTs (3U to 3W, 3X to 3Z) vertically, the DC power of the DC power supply 1 is supplied to the motor 5 as an AC power of controlled frequency and voltage.

In the inverter for driving a motor, shown in FIG. 10, the IGBTs (3U to 3W, 3X to 3Z) switch the DC power supply of a high-voltage large current in the IPM 2. For this reason, an increase of electromagnetic noise that is generated at the time of switching is the problem. Generation of electromagnetic noise causes errors in other devices installed in the vicinity of the inverter for driving a motor and generates noise in the radio and the like. Therefore, the characteristics of switching operations of IGBTs configuring a power converter, such as an inverter for driving a motor, are required to generate less noise.

Figure 7:
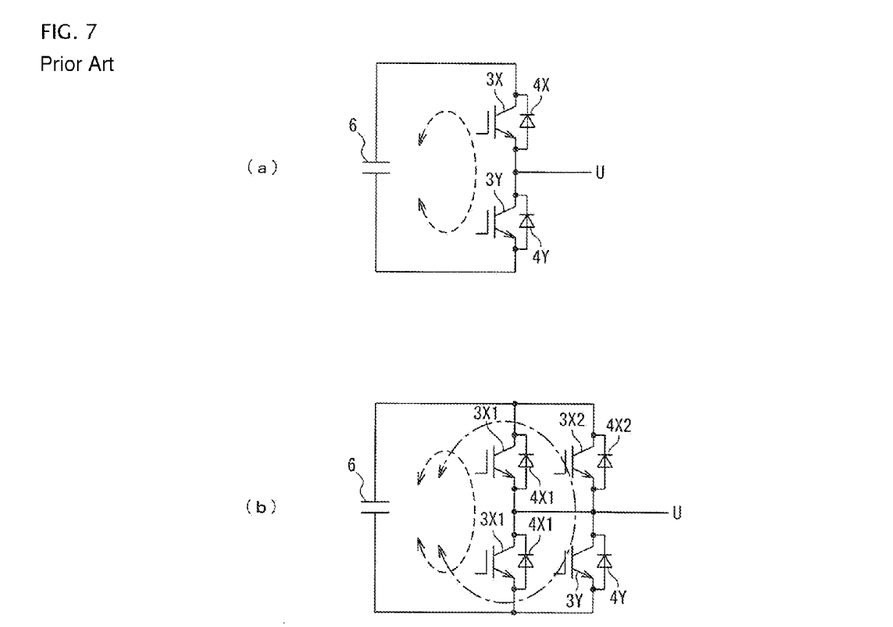
FIG. 7 is a schematic diagram showing a cause of generation of electromagnetic noise.

FIG. 7 is a schematic diagram showing a cause of generation of electromagnetic noise. FIG. 7(a) is a diagram schematically showing the U-phase of the IPM 2.

As shown in FIG. 10, the capacitor (snubber capacitor) 6 with low impedance is connected between the DC terminals 2a of the IPM, for the purpose of controlling a spike voltage that is generated when the IGBTs (3U to 3W, 3X to 3Z) of the respective phases are switched. The capacity of the snubber capacitor 6, parasitic inductances on wiring, and a capacity of a P-N junction between each IGBT (3U to 3W, 3X to 3Z) and each FWD (4X to 4W, 4X to 4Z) form an LC series resonant circuit. Switching the IGBTs/FWDs resonates the series resonant circuit and a high-frequency resonance current shown by a dashed line in FIG. 7(a). This high-frequency resonance current generates a magnetic field, causing noise.

In some cases, in order to obtain a current capacity, in the IPM 2 the IGBTs (3U to 3W, 3X to 3Z) and the FWDs (4X to 4W, 4X to 4Z) of the respective phases are configured by connecting a plurality of elements in parallel.

FIG. 7(b) shows a case in which two pairs of elements configuring the U-phase are connected in parallel. In other words, IGBTs 3X1, 3X2 shown in FIG. 7(b) correspond to the IGBT 3x shown in FIG. 7(a). The same is true for the other elements.

In FIG. 7(b), the IGBTs 3X1, 3X2 are turned ON/OFF at the same time. Therefore, two high-frequency resonance currents flow and overlap with each other between the DC terminals 2a, as shown by dashed lines. For this reason, electromagnetic noise tends to increase, compared to the case shown in FIG. 7(a).

It is generally effective to reduce the speed of switching an IGBT in order to suppress the generation of a high-frequency current, as described above. The speed of switching an IGBT indicates a time period between when the IGBT is turned OFF and when the IGBT is turned ON, and a time period between the IGBT is turned ON and when the IGBT is turned OFF. The ON state of the IGBT changes slowly to the OFF state as a result of reducing the switching speed, preventing the generation of a high-frequency resonance current. However, because switching losses increase, excessive reduction of the switching speed is not preferred.

Even when the switching speed is reduced, electromagnetic noise further increases when an IGBT or FWD of a certain phase and an IGBT or FWD of another phase are switched simultaneously.

Such simultaneous switching of multiple phases occurs when the voltage command values of a plurality of phases are equal to each other. The simultaneous switching of multiple phases occurs at points (A) and (B) shown in FIG. 9. In the point (A), the waveform of a U-phase voltage command is equal to the waveform of a V-phase voltage command. When these voltage command values are compared in size with a carrier wave, ON signals are applied simultaneously to the U-phase IGBT (3U) and the V-phase IGBT (3V) and OFF signals are applied simultaneously to the X-phase IGBT (3X) and the Y-phase IGBT (3Y), as shown in FIG. 10.

Similarly, the U-phase voltage command value and the W-phase voltage command value are equal to each other at the point (B). Therefore, switching signals are applied simultaneously to the U-phase IGBT (3U) and the W-phase IGBT (3W) as well as to the X-phase IGBT (3X) and the Z-phase IGBT (3Z).

Figure 11:
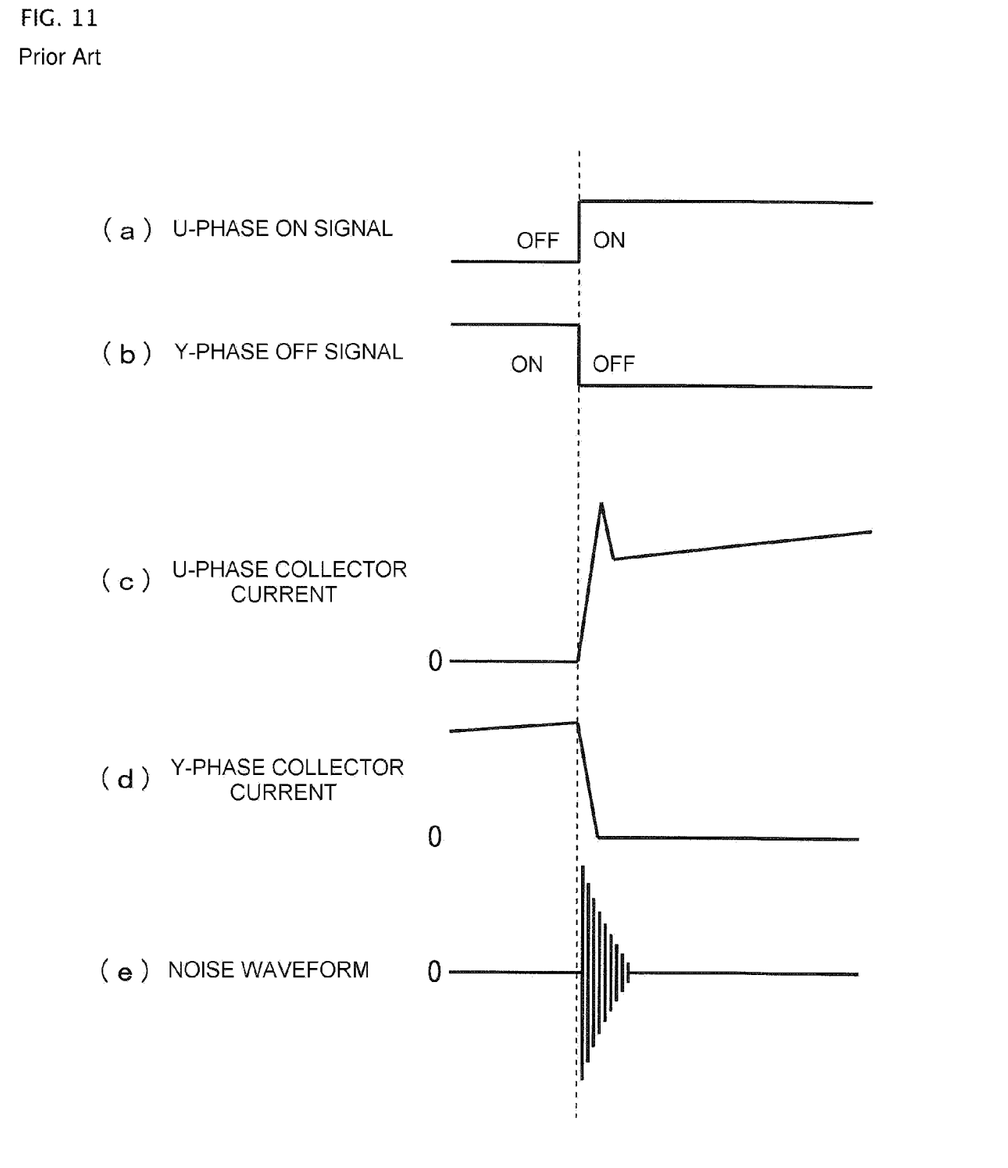
FIG. 11 is a waveform diagram showing simultaneous switching of multiple phases.

FIG. 11 is a waveform diagram showing the simultaneous switching of multiple phases. For instance, as shown in the point (A) of FIG. 9, when the U-phase IGBT (3U) is turned ON as shown in FIG. 11(a) and, at the same time, the Y-phase IGBT (3Y) is turned OFF as shown in FIG. 11(b), high-frequency resonance currents that are generated by separate switching operations of these IGBTs are overlapped with each other. As a result, the peaks of the high-frequency resonance currents increase as shown in FIG. 11(e), resulting in an increase of electromagnetic noise.

Thus, there are known devices and methods for adjusting pulses to prevent simultaneous switching of upper arm-side elements and lower arm-side elements when a voltage command value of a power converter (an inverter device) is zero and a time difference between an ON-command time of the upper arm and an ON-command time of the lower arm is the same in each phase. See, for example, Japanese Patent Application Publication No. 2008-236889 (also referred to herein as "Patent Document 1").

The conventional technology of Patent Document 1 is applied when the voltage command value of the power converter is zero. However, although this technology reduces noise generated as a result of simultaneous switching, the effect of noise reduction cannot be achieved under an operating condition where the power converter is used in a normal state. In addition, the effect of noise reduction is not obtained when the upper arm-side elements of a plurality of phases of the power converter are switched simultaneously. Thus, as described above, there is a need in the art for improved power converters.

SUMMARY OF THE INVENTION

Embodiments of the invention address these and other needs. Certain embodiments of the invention provide a power converter that suppresses electromagnetic noise when a power semiconductor element, which is a switching element, switches a DC power supply of a high-voltage large current in the power converter (an IPM used therein), and a control method of the power converter.

A first aspect of a control method of a power converter according to some embodiments is a control method of a power converter having a plurality of power semiconductor switching elements, the control method having the steps of: detecting state changes of ON/OFF pulses that are input to the power semiconductor switching elements respectively; and, when timings of the state changes of any of the ON/OFF pulses match each other, delaying the state change of any one of the ON/OFF pulses of which state changes match each other.

The plurality of power semiconductor switching elements can be bridge-connected so as to configure a power conversion circuit. When voltage command values of two different phases, out of voltage command values of a plurality of phases that control an output voltage of the power conversion circuit, match each other, and when levels of the matching voltage command values match a level of the carrier wave for generating the ON/OFF pulses, it is determined that the state changes of the ON/OFF pulses of the two phases match each other, and the state change of either one of the ON/OFF pulses, of which state changes match each other, is delayed.

A first aspect of a power converter according to some embodiments of the invention is a power converter, having:

a power conversion circuit in which a plurality of power semiconductor switching elements are bridge-connected; a drive circuit that drives the power semiconductor switching elements; a voltage command circuit that outputs voltage command values of respective phases, which control an output voltage of the power conversion circuit; a carrier wave generating circuit that outputs a carrier wave for generating ON/OFF pulses for turning the power semiconductor switching elements ON/OFF; and a pulse distribution circuit that outputs ON/OFF pulses for turning the power semiconductor switching elements ON/OFF based on a comparison signal obtained by comparing the voltage command values with the carrier wave. The power converter also has a timing adjustment circuit that receives input of the voltage command values of the respective phases that are output by the voltage command circuit, the carrier wave, and the ON/OFF pulses that are output from the pulse distribution circuit and used for turning the power semiconductor switching elements ON/OFF, determines that state changes of the ON/OFF pulses match each other when the voltage command values of two different phases, out of the voltage command values of the plurality of phases output from the voltage command circuit, match each other and when levels of the voltage command values match a level of the carrier wave as a result of comparing the voltage command values with the carrier wave, delays a state change of either one of the ON/OFF pulses of which state changes match each other, and outputs, to the drive circuit, the resultant ON/OFF pulse as an ON/OFF signal having an adjusted pulse edge.

A second aspect of a power converter according to some embodiments of the invention is a power converter, having: a power conversion circuit in which a plurality of power semiconductor switching elements are bridge-connected; a drive circuit that drives the power semiconductor switching elements; a voltage command circuit that outputs voltage command values of respective phases, which control an output voltage of the power conversion circuit; a carrier wave generating circuit that outputs a carrier wave for generating ON/OFF pulses for turning the power semiconductor switching elements ON/OFF; and a pulse distribution circuit that outputs ON/OFF pulses for turning the power semiconductor switching elements ON/OFF based on a comparison signal obtained by comparing the voltage command values with the carrier wave. The power converter also has: a plurality of state change detectors that receive input of the ON/OFF pulses for the respective power semiconductor switching elements from the pulse distribution circuit and detect state changes of the ON/OFF pulses individually; and a state change delay part that delays any of the detected state changes of the ON/OFF pulses when the ON/OFF pulses, of which state changes match each other, are detected by the state change detectors.

Embodiments of the invention can avoid simultaneous ON/OFF operations of the switching elements of a plurality of phases of the power converter, preventing the generation of electromagnetic noise.

DETAILED DESCRIPTION

Figure 1:
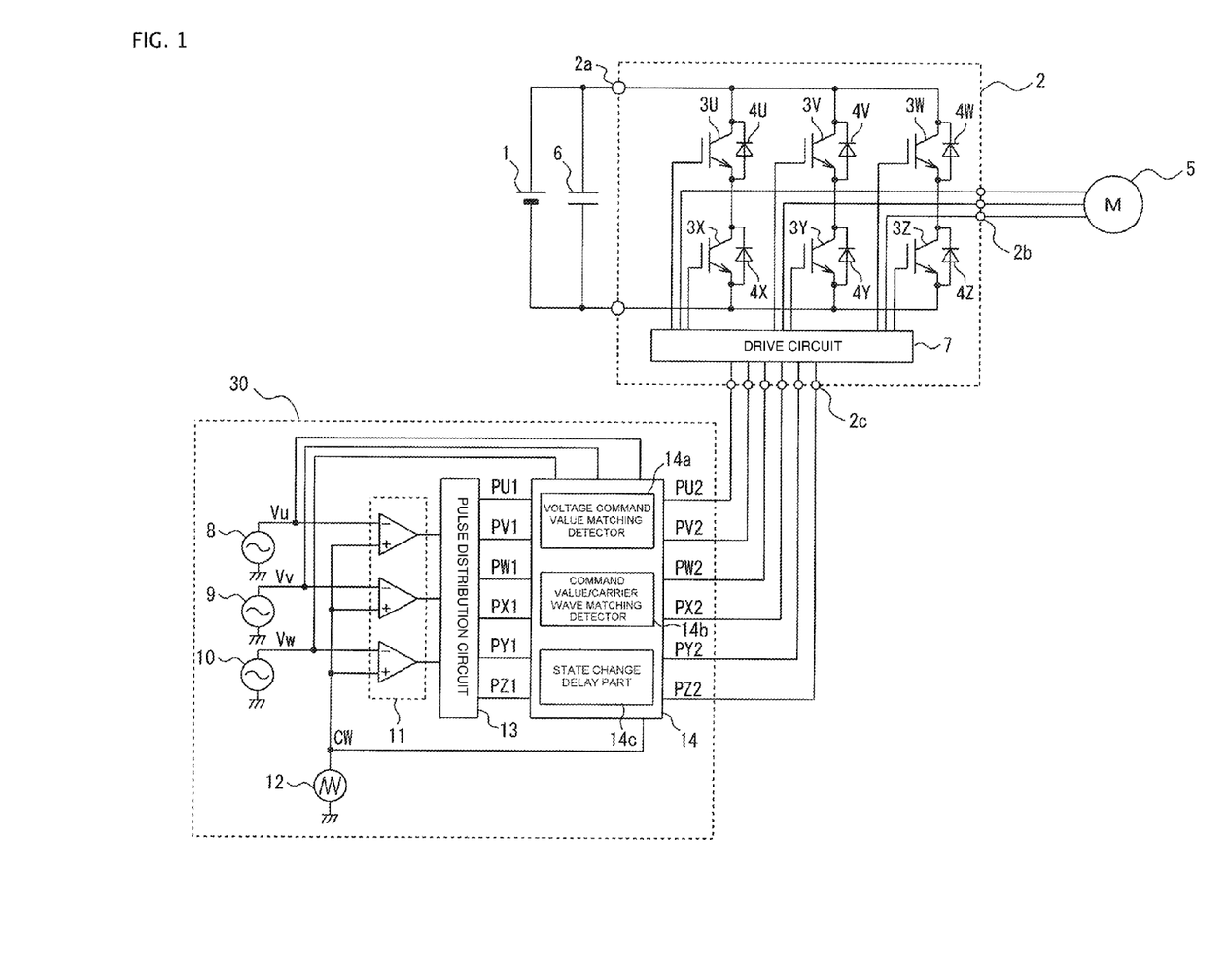
FIG. 1 is a circuit diagram showing a first embodiment of the invention.
Figure 2:
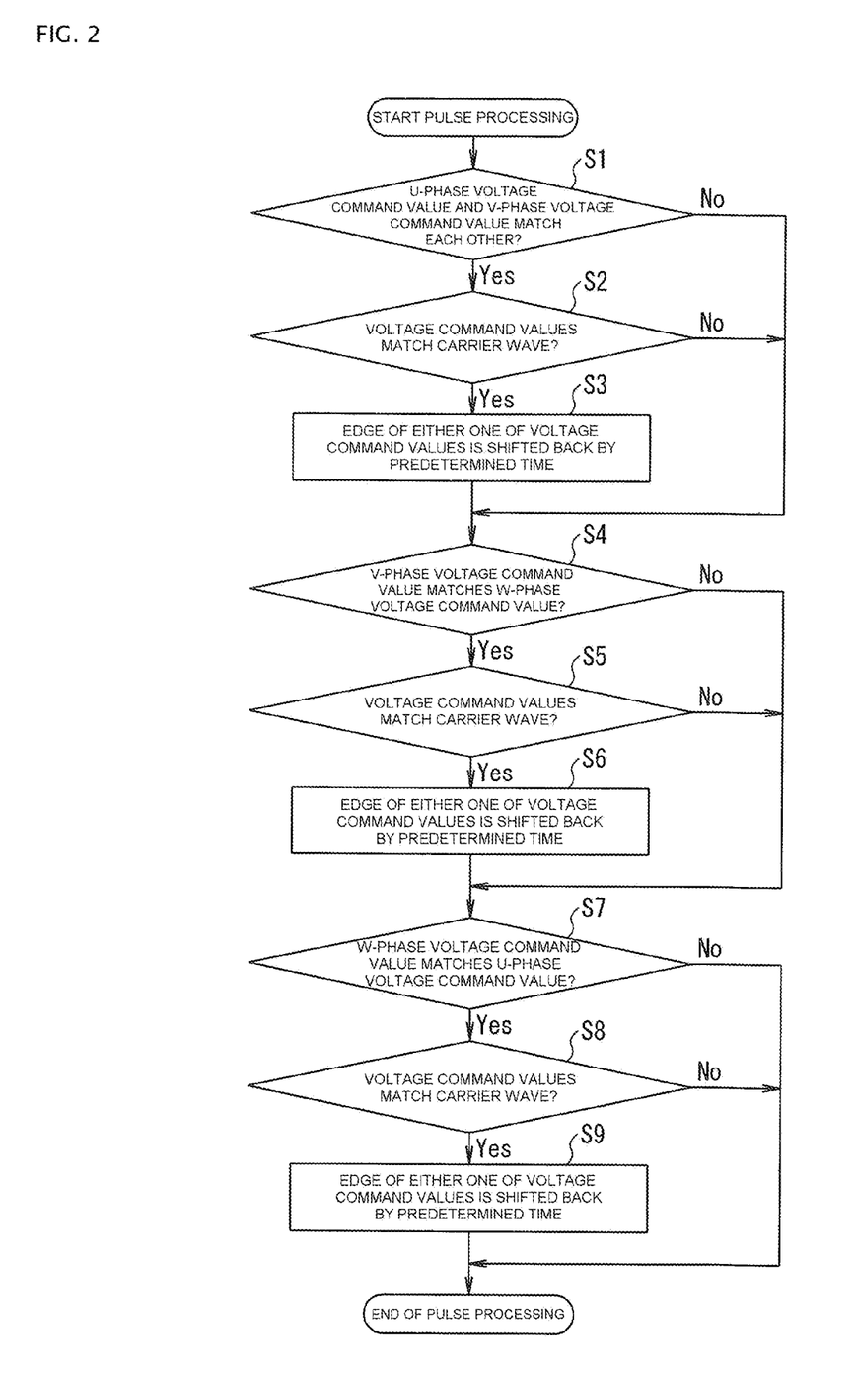
FIG. 2 is a flowchart of a pulse adjustment process executed by a timing adjustment circuit of FIG. 1.
Figure 3:
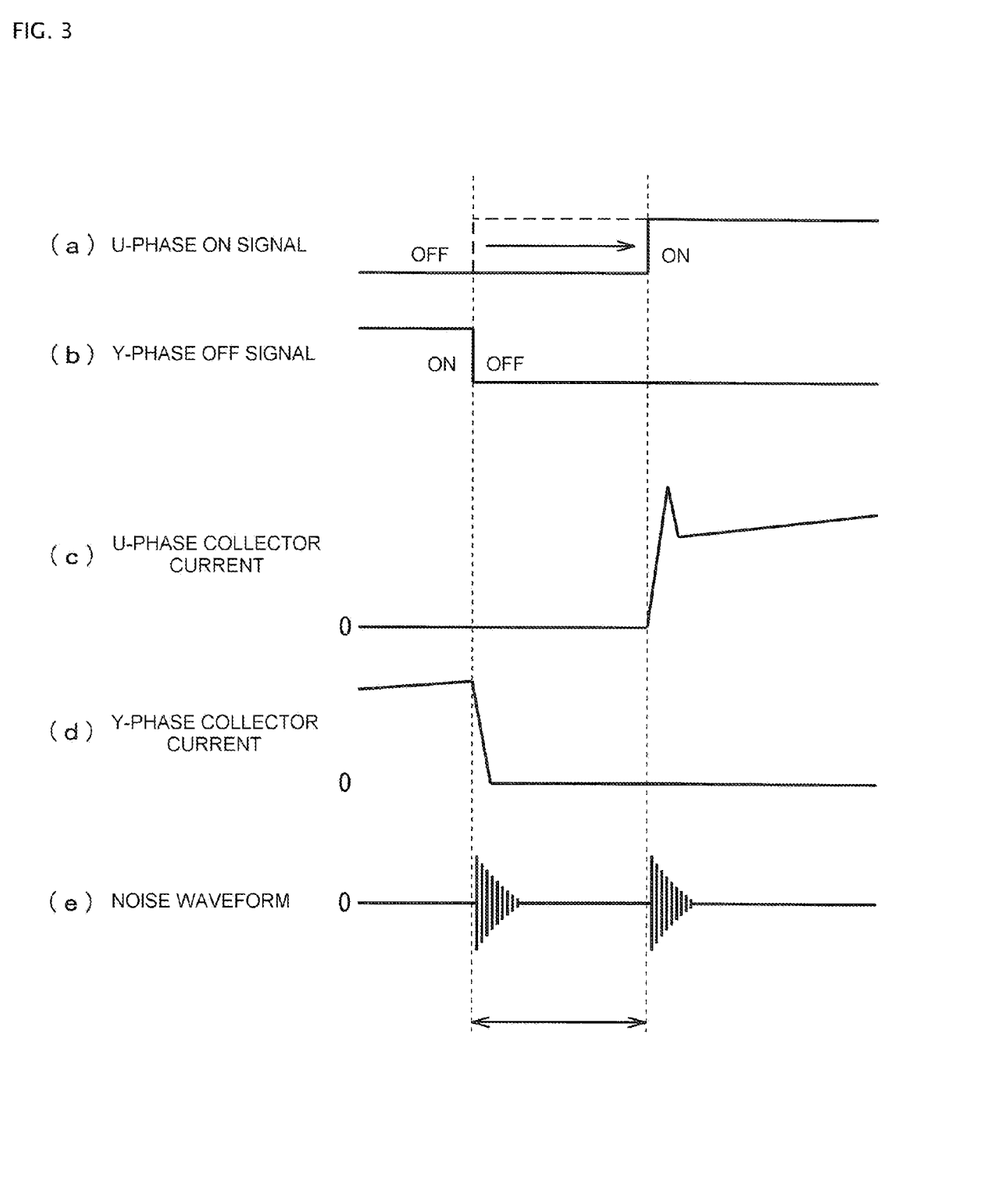
FIG. 3 is a waveform diagram of switching operations performed in an embodiment of the invention.

FIG. 1 is a circuit block diagram for explaining an embodiment of the invention. FIG. 2 is a flowchart of a pulse adjustment process. FIG. 3 is a waveform diagram for explaining operations of the pulse adjustment process. Note in FIG. 1 that the same reference numerals are applied to the components same as those of FIG. 10, and thus the overlapping description is omitted.

In FIG. 1, reference numeral 30 represents a control circuit provided outside an IPM 2. The control circuit 30 has a timing adjustment circuit 14. Outputs of a pulse distribution circuit 13, output voltage command values Vu, Vv and Vw that are output from voltage command circuits 8 to 10 of respective phases, and a carrier wave generating circuit 12, are input to the timing adjustment circuit 14.

In the control circuit 30, the pulse distribution circuit 13 outputs ON/OFF pulses PU1, PV1, PW1, PX1, PY1, PZ1, as in the example shown in FIG. 10. These output signals, which are ON/OFF signals of gates of IGBTs, are compared with the output voltage command values Vu, Vv and Vw of the respective phases and a carrier wave CW by a comparator 11, and generated as the ON/OFF pulses PU1, PV1, PW1, PX1, PY1, PZ1 for the respective IGBTs (3U to 3W, 3X to 3Z) by the pulse distribution circuit 13 based on the result of the comparison performed by the comparator 11. Dead times are adjusted for the ON/OFF pulses by the pulse distribution circuit 13 so that the IGBTs (IGBTs 3U and 3X, 3V and 3Y, 3W and 3Z) configuring upper and lower arms of the IPM 2 are not turned ON simultaneously. The dead times are sent to the timing adjustment circuit 14.

As shown in FIG. 1, the timing adjustment circuit 14 has a voltage command value matching detector 14a, a command value/carrier wave matching detector 14b, and a state change delay part 14c.

The voltage command value matching detector 14a sequentially compares voltage command values of two different phases to detect matching between the voltage command values. When the voltage command value matching detector 14a detects matching between the voltage command values of two different phases, the command value/carrier wave matching detector 14b detects matching between the levels of the matching voltage command values and the carrier wave. When the command value/carrier wave matching detector detects matching between the levels of the voltage command values and the level of the carrier wave, the state change delay part 14c delays a state change of an ON/OFF pulse corresponding to one of the two different phases.

In other words, the timing adjustment circuit 14 monitors a rising edge and a falling edge, namely a state change, of each of the input ON/OFF pulses of the respective phases alternately (six phases of the U, V, W phases and X, Y, Z phases, in case of a three-phase inverter). When the edges of any of the two ON/OFF pulses match each other, or, in other words, when simultaneous switching is performed, an operation to avoid the simultaneous switching is performed by turning the phases ON and OFF at different times (turning a certain phase ON and turning the other phase ON, turning the certain phase ON and turning the other phase OFF, turning the certain phase OFF and turning the other phase ON, and turning the certain phase OFF and turning the other phase OFF).

For example, FIG. 3 is described based on the example shown in FIG. 11 in which ON switching pulses or OFF switching pulses are input simultaneously (pulses that turn the U-phase IGBT 3U ON and the Y-phase IGBT 3Y OFF at the same time are input, as shown in the point (A) of FIG. 9). As shown in FIG. 3(a), the U-phase ON pulse is delayed. The U-phase is turned ON after the Y-phase shown in FIG. 3(b) is turned OFF. In this manner, a simultaneous switching operation for turning the U-phase of FIG. 3(a) ON and the Y-phase of FIG. 3(b) OFF can be avoided. Once the simultaneous switching operation can be avoided, a noise waveform can be dispersed as shown in FIG. 3(e), without allowing noises caused by the simultaneous switching operation to overlap with each other. As a result, the magnitudes (peaks) of the noises can be made smaller than those shown in FIG. 11(e).

When OFF signals are input simultaneously, the pulses may be adjusted in such a manner as to avoid a simultaneous OFF operation by delaying either one of the OFF signals.

Next is described a method for adjusting a pulse when ON switching pulses or OFF switching pulses are input at the same time, with reference to the flowchart of FIG. 2 that is executed by the timing adjustment circuit 14 including an arithmetic processing unit such as a microcomputer.

In FIG. 2, step S1 compares the U-phase voltage command value Vu (see Vu in FIG. 9) with the V-phase voltage command value Vv (see Vv in FIG. 9). When the U-phase voltage command value Vu and the V-phase voltage command value Vv do not match each other, the process proceeds to step S4, which is described hereinafter. When the U-phase voltage command value Vu and the V-phase voltage command value Vv match each other, the process proceeds to step S2.

When the U-phase voltage command value Vu and the V-phase voltage command value Vv match each other, step S2 compares the level of the voltage command value Vu or Vv with the carrier wave CW. Because the U-phase voltage command value Vu and the V-phase voltage command value Vv match each other in step S1, it is determined whether the level of the voltage command value Vu or Vv matches the level of the carrier wave (see CW in FIG. 9). When these levels do not match each other, the process proceeds to step S4. When these levels match each other, the process proceeds to step S3.

In step S3, an edge of either the U-phase ON/OFF pulse PU1 or the V-phase ON/OFF pulse PU2 is shifted back by a predetermined time period (e.g., approximately 0.5 to 1 microsecond) to delay the state change. The pulse edge shifting (delaying) time period here is set to fall within a range for preventing noise overlap caused by simultaneous switching and not affecting the output voltage values of the power converter.

The ON/OFF pulse to be shifted may be of the U-phase or V-phase. For instance, the U-phase pulse may be shifted with respect to the V-phase pulse, V-phase pulse may be shifted with respect to the W-phase pulse, and the W-phase pulse may be shifted with respect to the U-phase pulse. In this example, the U-phase ON/OFF pulse PU1 is shifted to obtain an adjusted pulse PU2.

Note that the dead time is adjusted for the U-phase. The X-phase ON/OFF pulse PX1 is also adjusted such that the dead time thereof is not reduced, the X-phase ON/OFF pulse PX1 being a logical value opposite to that of the U-phase ON/OFF pulse PU1, and the edge thereof is shifted to delay its state change.

In this example, the timing adjustment circuit 14 outputs the pulses PV1, PY1 as adjusted pulses PV2, PY2 without shifting the edges of the pulses PV1, PY1, and outputs the pulses PU1, PX1 as adjusted pulses PU2, PX2 by shifting the edges of the pulses PU1, PX1.

Similarly, in step S4 of FIG. 2, the V-phase voltage command Vv (see Vv in FIG. 9) is compared with the W-phase voltage command value Vw (see Vw in FIG. 9). When the V-phase voltage command value Vv and the W-phase voltage command value Vw do not match each other, the process proceeds to step S7, which is described hereinafter. When the V-phase voltage command value Vv and the W-phase voltage command value Vw match each other, the process proceeds to step S5.

Step S5 compares the level of the voltage command value Vv or Vw with the carrier wave CW. Because the V-phase voltage command value Vv matches the W-phase voltage command value Vw in step S4, it is determined whether the level of the voltage command value Vv or Vw matches the level of the carrier wave (see CW in FIG. 9). When these levels do not match each other, the process proceeds to step S7. When these levels match each other, the process proceeds to step S6.

In step S6, an edge of either the V-phase ON/OFF pulse PV1 or the W-phase ON/OFF pulse PW1 is shifted back by a predetermined time period (e.g., approximately 0.5 to 1 microsecond) to delay the state change. The pulse edge shifting (delaying) time period here is set to fall within a range for preventing noise overlap caused by simultaneous switching and not affecting the output voltage values of the power converter.

Similarly, in step S7 of FIG. 2, the W-phase voltage command Vw (see Vw in FIG. 9) is compared with the U-phase voltage command value Vu (see Vu in FIG. 9). When the W-phase voltage command value Vw and the U-phase voltage command value Vu do not match each other, the pulse adjustment process is ended. When the W-phase voltage command value Vw and the U-phase voltage command value Vu match each other, the process proceeds to step S8.

In step S8, the level of the voltage command value Vw or Vu is compared with the level of the carrier wave CW. Because the W-phase voltage command value Vw matches the U-phase voltage command value Vu in step S7, it is determined whether the level of the voltage command value Vw or Vu matches the level of the carrier wave CW (see CW in FIG. 9). When these levels do not match each other, the pulse adjustment process is ended. When these levels match each other, the process proceeds to step S9.

In step S9, an edge of either the W-phase ON/OFF pulse PW1 or the U-phase ON/OFF pulse PU1 is shifted back by a predetermined time period (e.g., approximately 0.5 to 1 microsecond) to delay the state change. The pulse edge shifting (delaying) time period here is set to fall within a range for preventing noise overlap caused by simultaneous switching and not affecting the output voltage values of the power converter.

As is clear from FIG. 9, when, for example, the U-phase voltage command value Vu matches the V-phase voltage command Vv, then the W-phase voltage command value Vw does not match the U-phase (or V-phase) voltage command value Vu (or Vv). Therefore, when the process of shifting the pulse edge is performed in step S3 of FIG. 2, the results of steps S4 and S7 become both "N (do not match)." Consequently, the pulse adjustment process is ended.

In FIG. 2, the voltage command value matching detector 14a performs the processes performed in steps S1, S4 and S7. The command value/carrier wave matching detector performs the processes performed in steps S2, S5 and S8. The state change delay part 14c performs the processes of the steps S3, S6 and S9.

The timing adjustment circuit 14 performs the pulse adjustment process as described above and outputs the ON/OFF pulses PU1, PV1, PW1, PX1, PY1, PZ1, which are input from the pulse distribution circuit 13, as the ON/OFF pulses PU2, PV2, PW2, PX2, PY2, PZ2 having the adjusted pulse edges.

In the first embodiment described above, regarding three phases, matching between a voltage command value Vi of an $i^{th}$ phase and a voltage command value Vj of a $j^{th}$ phase (i being U, V, W, and j being V, W, U) is detected. When the both values match each other, it is determined whether the level of the voltage command value Vi or Vj matches the level of the carrier wave CW. When the both values match each other, it is determined that falling edges between the ON states and the OFF states of ON/OFF pulses Pi1 and Pj1 of the respective $i^{th}$ and $j^{th}$ phases match rising edges between the OFF states and the ON states of the same, as shown in FIG. 9(a) or (b) described above. In other words, it can be determined that the state changes had occurred simultaneously. Subsequently, the edge of the ON/OFF pulse Pi1 or Pj1 is shifted back to delay the state change thereof. This can therefore prevent the power semiconductor switches of the plurality of phases of the power converter from being turned ON/OFF simultaneously and prevent the occurrence of electromagnetic noise.

In the example described above, PWM modulation is carried out by comparing the carrier wave with the sine waves that are the hardware-based voltage command values. However, by monitoring software-based switching of voltage vectors, the switching timing can be adjusted so as to avoid simultaneous switching.

Next, a second embodiment of the present invention is described with reference to FIGS. 4 to 6.

The second embodiment directly detects whether the state changes of the ON/OFF pulses PU1, PV1, PW1, PX1, PY1, PZ1, which are output from the pulse distribution circuit 13, match each other.

Figure 4:
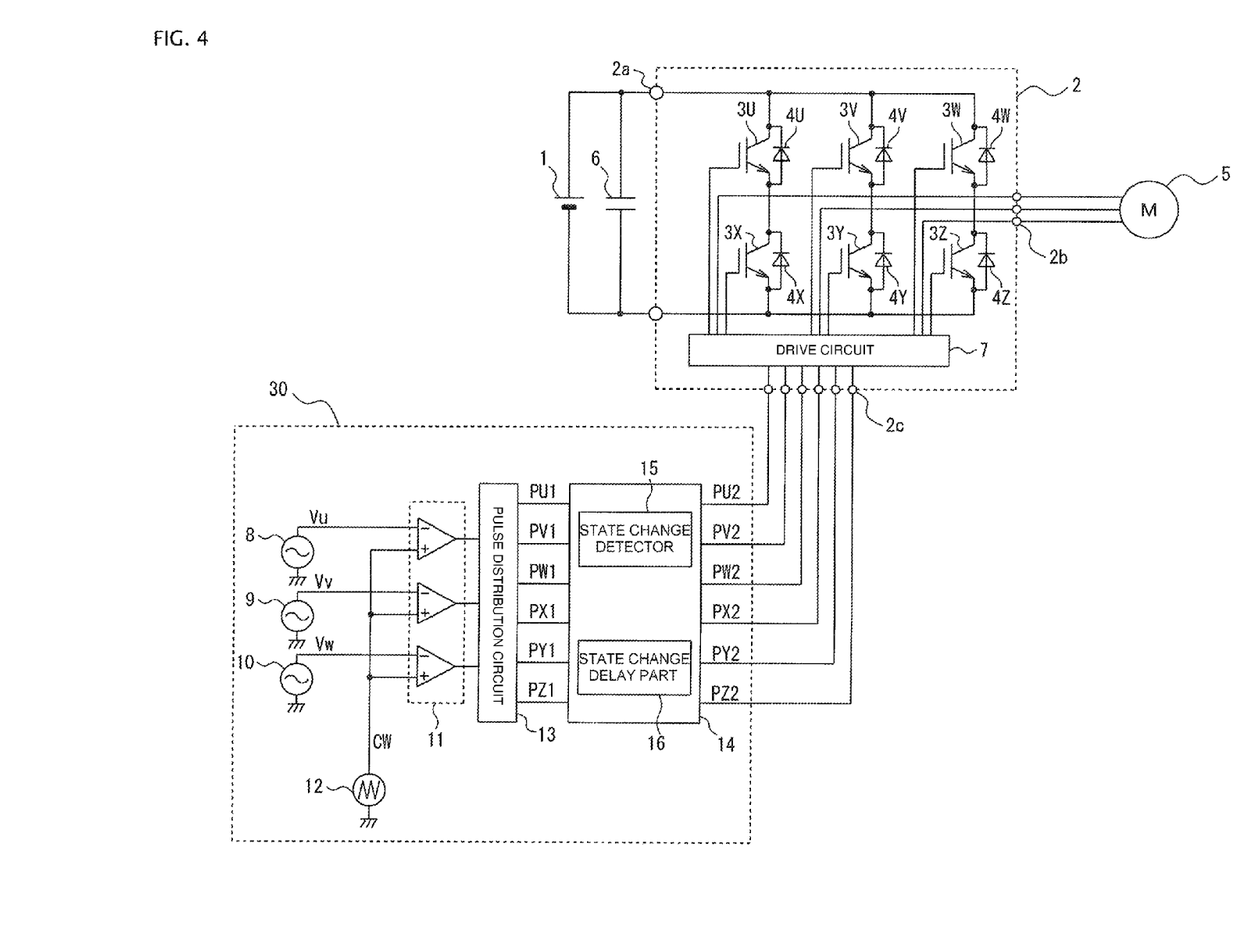
FIG. 4 is a circuit diagram showing a second embodiment of the invention.

In other words, in the second embodiment, only the ON/OFF pulses PU1, PV1, PW1, PX1, PY1, PZ1, which are output from the pulse distribution circuit 13, are input to the timing adjustment circuit 14, as shown in FIG. 4.

This timing adjustment circuit 14 has a state change detector 15 and a delay output part 16. The state change detector 15 detects whether the states of the ON/OFF pulses PU1, PV1, PW1, PX1, PY1, PZ1, which are input from the pulse distribution circuit 13, are changed from the ON states to the OFF states or from the OFF states to the ON states, and then counts the number of pulses whose states have changed. When the state change detector detects the ON/OFF pulses whose state changes match each other, the delay output circuit 16 delays any of the detected ON/OFF pulses by the abovementioned shifting (delaying) time period and outputs the resultant pulse.

Figure 5:
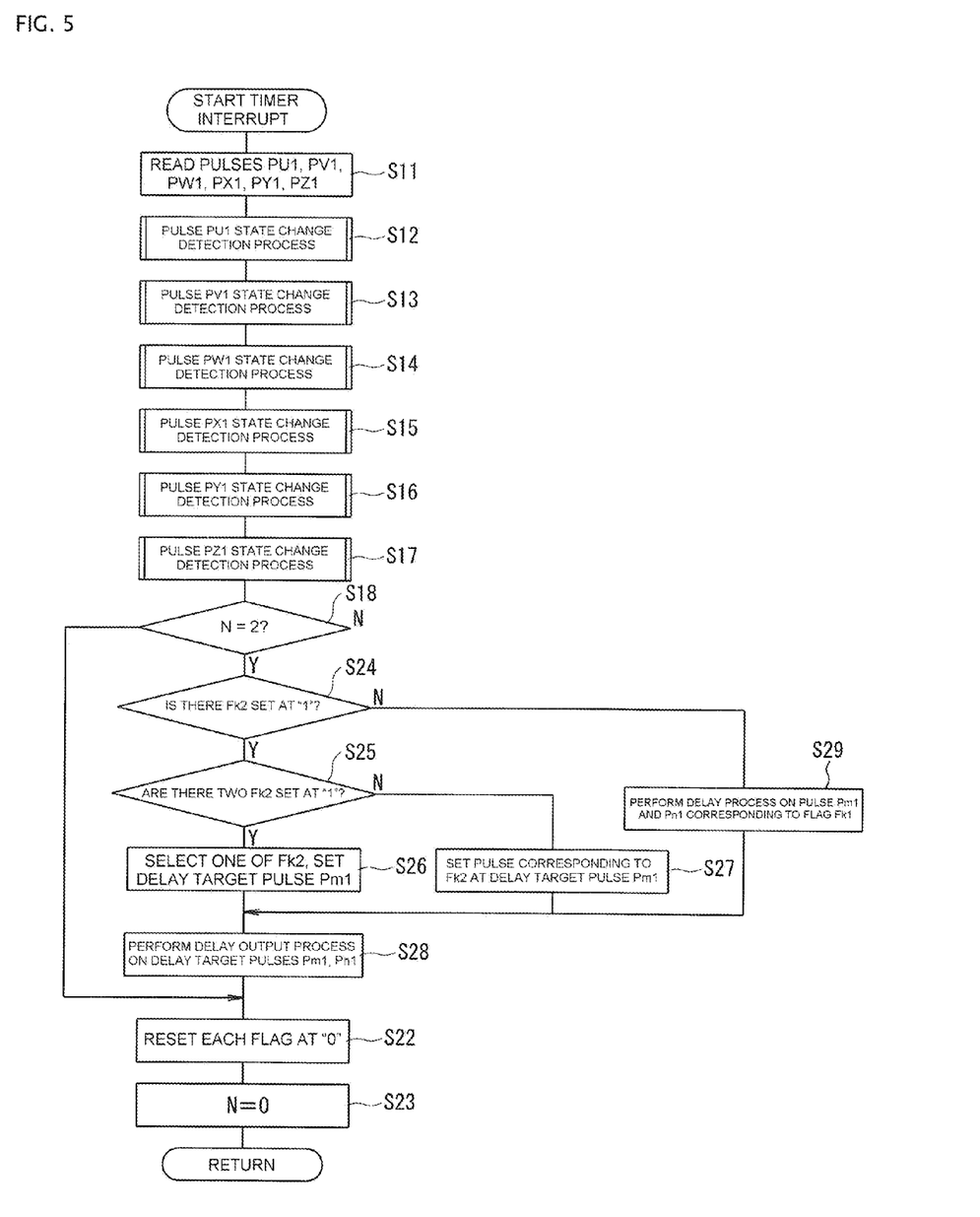
FIG. 5 is a flowchart showing a pulse adjustment process executed by a timing adjustment circuit of FIG. 4.

Then, the timing adjustment circuit 14 first executes the pulse adjustment process shown in FIG. 5 as a timer interrupt process for every predetermined time period (e.g., every 1 microsecond, although other time periods can be used).

In this pulse adjustment process, first, step S11 reads the ON/OFF pulses PU1, PV1, PW1, PX1, PY1, PZ1 that are output from the pulse distribution circuit 13.

Next, step S12 executes a pulse PU1 state change detection process for detecting whether the state of the ON/OFF pulse PU1 is changed or not.

Figure 6:
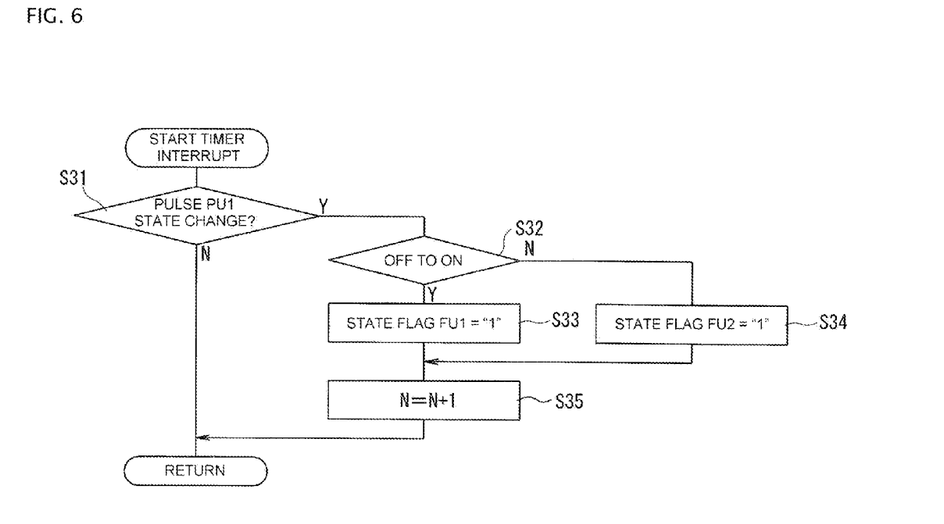
FIG. 6 is a flowchart showing a state change detection process of FIG. 5.

In this pulse PU1 state change detection process, first, step S31 determines whether the ON/OFF pulse PU1 changes from its previous state or not, as shown in FIG. 6. When detecting such state change, the ON/OFF state of the ON/OFF pulse PU1 that is obtained at the time of the previous timer interrupt is stored, and, when the state of this pulse changes from its ON state to its OFF state, or from its OFF state to its ON state, it is determined that the state of the pulse changes. When the state change is not detected in step S31, the timer interrupt process is ended, and the process is shifted to step S13 shown in FIG. 5.

On the other hand, when the state of the ON/OFF pulse PU1 changes as a result of the determination in step S31, the process is shifted to step S32. This step S32 determines whether the state changes from the OFF state to the ON state. When the state changes from the OFF state to the ON state, the process is shifted to step S33.

Step S33 sets a state flag FU1 indicating the shift from the OFF state to the ON state, which is a rising edge, at "1." Then, the process is shifted to step S34.

In step S34, a variable N, which is obtained by counting the number of state changes, is incremented by "1." Thereafter, the timer interrupt process is ended. The process is then shifted to step S13 shown in FIG. 5.

When the state of the ON/OFF pulse PU1 changes from the ON state to the OFF state as a result of the determination in step S32, the process is shifted to step S35, and a state flag FU2 indicating the shift to the OFF state, which is a falling edge, at "1." Subsequently, the process is shifted to step S34, and the variable N is incremented by "1."

Returning to FIG. 5, step S13 performs a pulse PV1 state change detection process, similar to the one shown in FIG. 6, to detect whether the state of the ON/OFF pulse PV1 is changed or not. Subsequently, the process is shifted to step S14.

Step S14 performs a pulse PW1 state change detection process, similar to the one shown in FIG. 6, to detect whether the state of the ON/OFF pulse PW1 is changed or not. Subsequently, the process is shifted to step S15.

Step S15 performs a pulse PX1 state change detection process, similar to the one shown in FIG. 6, to detect whether the state of the ON/OFF pulse PX1 is changed or not. Subsequently, the process is shifted to step S16.

Step S16 performs a pulse PY1 state change detection process, similar to the one shown in FIG. 6, to detect whether the state of the ON/OFF pulse PY1 is changed or not. Subsequently, the process is shifted to step S17.

Step S17 performs a pulse PZ1 state change detection process, similar to the one shown in FIG. 6, to detect whether the state of the ON/OFF pulse PZ1 is changed or not. Subsequently, the process is shifted to step S18.

Step S18 determines whether the variable N that is incremented in each state change detection process is 2 or not. When the variable N is less than 2, it is determined that there are no ON/OFF pulses of which state changes match each other. The process is then shifted to step S22. In this step S22, the state flags FU1 to FZ2, which are obtained in the respective state change detection processes, at "0," and the process is shifted to step S23. The variable N is cleared to "0." Subsequently, the timer interrupt process is ended.

When the variable N is "2" as a result of the determination in step S18, it is determined that there exist the ON/OFF pulses of which state changes match each other at the same timing. Subsequently, the process is shifted to step S24.

Step S24 determines whether there exist the ON/OFF pulses with falling edges, the states of which change from the ON states to the OFF states. This determination is performed by determining whether there exists a state flag Fk2 that is set at "1" (k=U, V, W, X, Y, Z).

When it is determined in step S24 that there exists the state flag Fk2 that is set at "1," the process is shifted to step S25, and it is determined whether there exist two of the state flags Fk2 that are set at "1." When it is determined that there exists one state flag Fk2 that is set at "1," the process proceeds to step S26. An ON/OFF pulse Pk1 corresponding to this state flag Fk2 is set as a delay target pulse Pm1, and then the process is shifted to step S28.

When it is determined in step S25 that there exist two state flags Fk2 that are set at "1," the process is shifted to step S27, and one of two ON/OFF pulses corresponding to these two state flags Fk2 is selected. When selecting one of the ON/OFF pulses, the ON/OFF pulse that is close to, for example, the PU1 is selected. The selected ON/OFF pulse is set as the delay target Pm1, and then the process is shifted to step S28.

Step S28 performs a delay output process of delaying the delay target pulse Pm1, which is set in step S26 or S27, and an ON/OFF pulse Pn1, which is an ON/OFF inverted signal of the delay target pulse Pm1, by the above-mentioned predetermined shift (delay) time period and then outputting the resultant pulses. Subsequently, the process is shifted to step S22 described above.

When it is determined in step S24 that the state flag Fk2 set at "1" does not exist, it is determined that there exist two state flags Fk1 that are set at "1." Subsequently, the process is shifted to step S29, and one of two ON/OFF pulses corresponding to the two state flags Fk1 is selected. When selecting one of the ON/OFF pulses, the ON/OFF pulse that is close to, for example, the PU1 is selected. The selected ON/OFF pulse is set as the delay target Pm1, and then the process is shifted to step S28.

In the pulse adjustment process shown in FIG. 5, the state change detector 15 performs the processes performed in steps S11 to S17 and the process shown in FIG. 6, and the state change delay part 16 performs the processes performed in steps S18 to S29.

According to the second embodiment, the timing adjusting circuit 14 monitors the state changes of the ON/OFF pulses PU1, PV1, PW1, PX1, PY1, PZ1 that are input from the pulse distribution circuit 13. In a case in which the states of ON/OFF pulses of two different phases change simultaneously, when either one of the ON/OFF pulses has its state changed from, for example, the ON state to the OFF state, that is, when either one of the ON/OFF pulses has a falling edge, the ON/OFF pulse whose state is changed from the ON state to the OFF state is selected, and the delay output process is performed on the selected ON/OFF pulse and an ON/OFF inverted pulse. Therefore, simultaneous state changes of two IGBTs in the inverter circuit can be prevented reliably.

Therefore, as with the first embodiment described above, the power semiconductor switch elements of the plurality of phases of the power converter can be prevented from being turned ON or OFF simultaneously, preventing the generation of electromagnetic noise.

According to the second embodiment, because the timing adjustment circuit 14 detects matching of state changes based on the ON/OFF pulses input from the pulse distribution circuit 13, which take into account the dead times, the power semiconductor switches of the plurality of phases can reliably be prevented from being turned ON or OFF simultaneously.

The second embodiment has described the case in which the delay output process is performed preferentially on the ON/OFF pulses having falling edges, i.e., having the states thereof changed from the ON states to the OFF states. However, the present invention is not limited thereto, and the delay output process may be performed preferentially on the ON/OFF pulses having rising edges, i.e., having the states thereof changed from the OFF states to the ON states.

In the description of the present specification, pulse widths are adjusted based on the rising and falling edges of the ON/OFF pulses to be input; however, the objet of the present invention is to avoid simultaneous switching of IGBTs. Thus, when a switching time period of each IGBT itself and a transmission delay time period of the drive circuit embedded in the IGBT cannot be ignored, matching or state changes of the rising and falling edges may be determined in consideration of the delay time period.

Regarding the delay time period of each pulse, because the switching time period of a normal IGBT is approximately 100 ns and an attenuation time period of the above-mentioned high-frequency resonance current that is generated at the time of switching is approximately several us, adjusting this level of pulse can prevent an increase of noise that is generated due to overlapping currents.

Furthermore, the embodiments have described the case where the number of phases of the load is 3; however, the present invention is not limited thereto and can be applied to a case where the number of phases of the load is 4 or more.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

What is claimed is:

1. A control method of a power converter having a plurality of power semiconductor switching elements, the control method comprising:

reading, sequentially, at a timing adjustment circuit, ON/OFF pulses that are output from a pulse distribution circuit;

executing a state change detection process for each of the ON/OFF pulses;

determining whether there are any rising edge state changes of the ON/OFF pulses;

determining whether there are any falling edge state changes of the ON/OFF pulses;

determining if there are two simultaneous state changes of the ON/OFF pulses; selecting, in the case that there two simultaneous state changes of the ON/OFF pulses, one of the ON/OFF pulses to be delayed; and delaying the state change of the selected ON/OFF pulse, independent of, and not based on, a voltage level of a carrier wave, the delayed ON/OFF pulse being selected based on a number of rising edge and a number of falling edge state changes of the ON/OFF pulses.

2. The control method of the power converter according to claim 1,
wherein the plurality of power semiconductor switching elements are bridge-connected to configure a power conversion circuit.

3. The control method of the power converter according to claim 1,
wherein the selecting includes:
selecting, if only one state change of the ON/OFF pulses is a falling edge state change, the ON/OFF pulse that undergoes the falling edge state change to be delayed.

4. The control method of the power converter according to claim 1,
wherein the selecting includes:
selecting, if two state changes of the ON/OFF pulses are falling edge state changes, one of the ON/OFF pulses that undergoes the falling edge state change to be delayed.

5. The control method of the power converter according to claim 1,
wherein the selecting includes:
selecting, if two state changes of the ON/OFF pulses are rising edge state changes, one of the ON/OFF pulses that undergoes the rising edge state change to be delayed.

6. A power converter, comprising:
a power conversion circuit in which a plurality of power semiconductor switching elements are bridge-connected;
a drive circuit that drives the power semiconductor switching elements;
a voltage command circuit that outputs voltage command values of respective phases, which control an output voltage of the power conversion circuit;
a pulse distribution circuit that outputs ON/OFF pulses based on a comparison signal obtained by comparing the voltage command values with a carrier wave, a timing adjustment circuit that receives the ON/OFF pulses from the pulse distribution circuit, reads, sequentially, at the timing adjustment circuit, the ON/OFF pulses that are output from the pulse distribution circuit, executes a state change detection process for each of the ON/OFF pulses, determining whether there are any rising edge state changes of the ON/OFF pulses, determines whether there are any falling edge state changes of the ON/OFF pulses, determines if there are two simultaneous state changes of the ON/OFF pulses, selects, in the case that there two simultaneous state changes of the ON/OFF pulses, one of the ON/OFF pulses to be delayed, delays the state change of the selected ON/OFF pulse, independent of, and not based on, a voltage level of the carrier wave, and outputs, to the drive circuit, the resultant delayed ON/OFF pulse as the ON/OFF signal having an adjusted pulse edge, the delayed ON/OFF pulse being selected based on a number of rising edge and a number of falling edge state changes of the ON/OFF pulses.

7. The power converter according to claim 6,
wherein the timing adjustment circuit selects, if only one state change of the ON/OFF pulses is a falling edge state change, the ON/OFF pulse that undergoes the falling edge state change to be delayed.

8. The power converter according to claim 6,
wherein the timing adjustment circuit selects, if two state changes of the ON/OFF pulses are falling edge state changes, one of the ON/OFF pulses that undergoes the falling edge state change to be delayed.

9. The power converter according to claim 6, wherein the timing adjustment circuit selects, if two state changes of the ON/OFF pulses are rising edge state changes, one of the ON/OFF pulses that undergoes the rising edge state change to be delayed.

10. The power converter according to claim 6, wherein the drive circuit, which drives the power semiconductor switching elements, are stored in one package to configure an intelligent power module.

* * * * *